C. BARTON.
Corn-Planter.
No. 19,333.
Patented Feb 16, 1858.
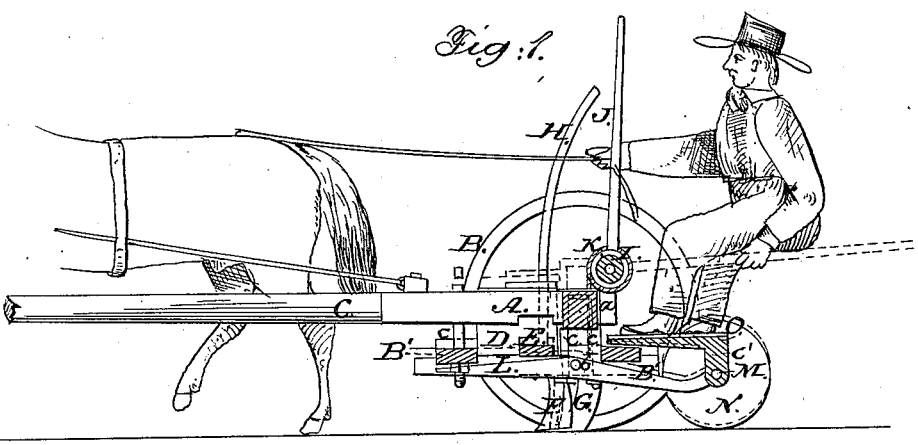
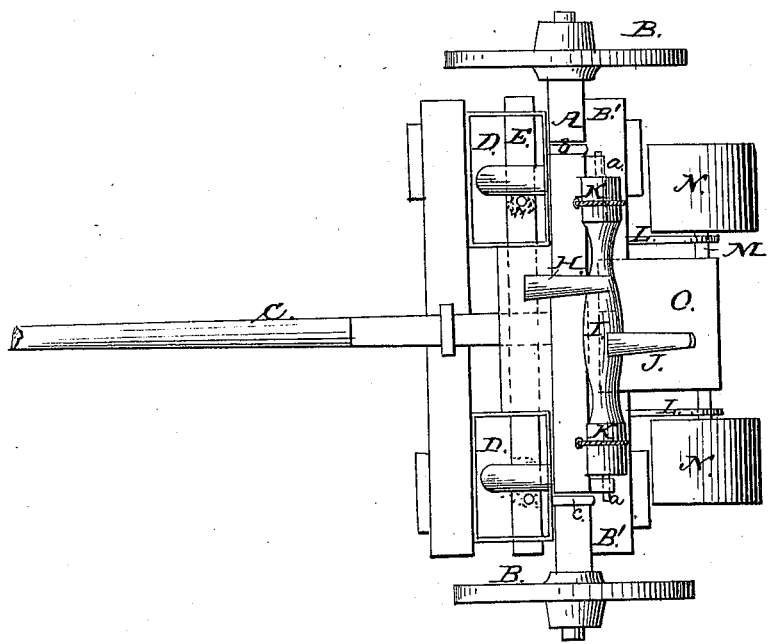

UNITED STATES PATENT OFFICE.

CHESTER BARTON, OF SAVOY, MASSACHUSETTS.

IMPROVEMENT IN SEEDING-MACHINES.

Specification forming part of Letters Patent No. 19,333, dated February 16, 1858.

*To all whom it may concern:*

Be it known that I, CHESTER BARTON, of Savoy, in the county of Berkshire and State of Massachusetts, have invented a new and useful Improvement in Seeding-Machines; and I do hereby declare that the following is a full, clear, and exact description of the same, reference being had to the annexed drawings, making a part of this specification, in which—

Figure 1 is a side sectional elevation of a seeding-machine constructed according to my improvement. Fig. 2 is a plan or top view of same.

Similar letters of reference indicate corresponding parts in the two figures.

This invention consists in attaching the frame which carries the seed-distributing device, and to which frame the pressure-rollers and driver's stand are attached, to the axle of the wheels in such a way that the frame may be readily raised, when necessary, by the driver and kept in an elevated state, so that the rollers, conveying-tubes, and covering-shares will be free from the ground while the machine is being drawn from place to place, and also at other times, where it is not designed to distribute the seed, the parts being so arranged, also, that the weight of the driver serves to increase the pressure of the rollers when in use, and also rendered subservient in keeping the frame and the attached parts in an elevated state when thus adjusted.

To enable those skilled in the art to fully understand and construct my invention, I will proceed to describe it.

A represents an axle, having a wheel, B, at each end, and C is a draft-pole, the inner end of which is secured to the center of the axle, the axle being stationary and the wheels fitted loosely thereon.

B' is a horizontal rectangular frame, which is suspended from the axle A and pole C by iron loops or eyes c c c, said loops or eyes encompassing the axle A and pole C, one near each end of the axle and the other at the inner end of the pole. The loops or eyes are fitted and work in grooves in the sides of the axle and pole, so that the frame B' is prevented from moving laterally; but the loops or eyes are sufficiently long to permit a requisite degree of vertical play. (See Fig. 1.)

On the front part of the frame B' two seed boxes or hoppers, D D, are placed, and E is a reciprocating perforated slide, which is fitted and works at the bottom of the boxes D D, and carries the seed in proper quantities from the boxes to the conveying-tubes F F, which conduct it to the ground, the lower ends of the tubes forming the furrows to the seed, and a covering-share, G, which is placed behind each tube F, covering the seed as it is dropped from the tubes. A reciprocating movement is given the slide E by means of a lever, H, which is operated by the driver.

The seed-distributing device is well known and in quite common use, and the conveying-tubes F and covering-shares G are also arranged in the usual way.

On the upper part of the axle A a shaft, I, is placed, and fitted in suitable bearings, a a. A lever, J, is attached at right angles to the center of the shaft I, and a cord or chain, K, is attached to each end of the shaft I, said cords or chains passing through the axle and having their ends attached to the frame.

Near each end of the frame B' and to its under side a lever, L, is attached, as shown at b, and through the outer or back ends of the levers L L a shaft, M, passes, said shaft being allowed to turn freely in the levers. On each end of the shaft M a roller, N, is placed, said rollers being in line with the tubes F and shares G. The levers L are allowed to work freely on their fulcra b, and the front end of the levers extend nearly to the front end of the frame B', and where they bear against its under side they support or retain the rollers N N. On the shaft M, at about its center, the driver's stand O is placed, the shaft passing loosely through pendants c', attached to its back end, the front end of the stand resting or bearing on the back end of the frame B'.

The operation is as follows: As the machine is drawn along, the driver is on the stand O, operates the lever H by hand, giving the slide E a reciprocating motion, and causing the seed to be conveyed into the tubes F, the seed passing through said tubes into the furrows made by the lower ends of the tubes and covered by the shares, the soil being pressed down on the seed by the rollers N N, the pressure of which is increased by the weight of the driver. When it is not designed to drop the seed the driver grasps the lever J of shaft I and draws it backward, and by so doing the shaft I is turned, the cords or chains K raising the frame B', and consequently the rollers N N, tubes F F, and shares G G, free from the ground, the whole being supported by the shaft I, axle A, and wheels B, and the driver, by depressing the lever J to a horizontal position and sitting thereon, as shown in red, Fig. 1, not only relieves the stand O and frame B' of his weight, but renders his weight subservient in keeping said frame and its attachments in an elevated state. Thus it will be seen that the parts which are necessarily depressed when the seed is distributed and require to be raised when the implement is being drawn from place to place, or in turning at the ends of rows, are readily adjusted, and the weight of the driver rendered subservient in adding to the efficiency of the rollers when in use, and also of retaining, when necessary, the frame B' in an elevated state.

I do not claim the employment or use of the pressure-rollers, nor do I claim the seed-distributing device, for these are old and well-known devices and in common use; but,

Having thus described my invention, what I claim as new, and desire to secure by Letters Patent, is—

The frame B', provided with the seed-distributing device, and having the pressure-rollers N N and driver's stand O attached, when said frame is connected with the axle A, and the shaft or windlass I or its equivalent, and the whole arranged to operate substantially as and for the purpose herein set forth.

CHESTER BARTON.

Witnesses:
W. TUSCH,
J. W. COOMBS.